United States Patent [19]
Morishita

[11] Patent Number: 4,893,688
[45] Date of Patent: Jan. 16, 1990

[54] ELECTRIC REAR WHEEL STEERING APPARATUS

[75] Inventor: Mitsuharu Morishita, Himeji, Japan

[73] Assignee: Mitsubishi Denki Kabushiki Kaisha, Tokyo, Japan

[21] Appl. No.: 245,438

[22] PCT Filed: Nov. 30, 1987

[86] PCT No.: PCT/JP87/00928
§ 371 Date: Sep. 23, 1988
§ 102(e) Date: Sep. 23, 1988

[87] PCT Pub. No.: WO88/04251
PCT Pub. Date: Jun. 16, 1988

[30] Foreign Application Priority Data
Dec. 4, 1986 [JP] Japan .................. 61-290671

[51] Int. Cl.⁴ .......... B62D 5/04; B62D 6/02; B62D 7/14
[52] U.S. Cl. .................. 180/79.1; 180/140; 192/0.02 R; 192/84 R; 280/91
[58] Field of Search .......... 180/79.1, 140, 141, 180/142; 280/91; 192/0.02 R, 84 R

[56] References Cited
U.S. PATENT DOCUMENTS

| 4,762,194 | 8/1988 | Morishita et al. | 180/79.1 |
| 4,779,693 | 10/1988 | Takahashi et al. | 180/140 |
| 4,782,907 | 11/1988 | Morishita et al. | 180/140 |
| 4,789,040 | 12/1988 | Morishita et al. | 180/79.1 X |

FOREIGN PATENT DOCUMENTS

88/04251  6/1988  World Int. Prop. O. .......... 180/140

Primary Examiner—Mitchell J. Hill
Attorney, Agent, or Firm—Sughrue, Mion, Zinn, Macpeak & Seas

[57] ABSTRACT

An electric rear wheel steering apparatus provided with an electromagnetic clutch 12 between a motor 11 for driving rear wheels 9 and a worm reduction gear 12 having a reversion efficiency of zero or lower, and a control unit 20 adapted to cut off an electric current flowing to the motor 11 and disengage the electromagnetic clutch 12 when an abnormal operation other than predetermined operation is ascertained. When an abnormal operation is detected, the rear wheel steering gear is fixed in the actual position by a control operation of the control unit 20, so that the rear wheels are prevented from becoming uncontrollable.

2 Claims, 2 Drawing Sheets

ELECTRIC REAR WHEEL STEERING APPARATUS

FIELD OF THE INVENTION

This invention relates to an electric rear wheel steering apparatus which operates in cooperation with front wheel steering of a vehicle, and steers the rear wheels by a motor.

DESCRIPTION OF THE PRIOR ART

Hitherto, in this type of electric rear wheel steering apparatus, the steering angle of rear wheels has been indicated in response to a signal from the steering wheel state sensor or a vehicle speed sensor, a feedback signal has been obtained to see whether the rear wheels are at a predetermined steering speed and angle, and an error of the predetermined steering angle of the rear wheels and the actual steering angle of the rear wheels has been detected, and a voltage to be applied to the motor for steering the rear wheels has been calculated in the closed loop control.

In the actual vehicles, however, since the sensors are installed over a wide range in parts of the vehicle, they must be connected by wiring. Accordingly, if a trouble should occur in these sensors or wiring, the rear wheels were steered without control even if it was not necessary to steer the rear wheels, or, to the contrary, the motor could not be driven due to breakage of power supply line or the like, and the positions of the rear wheels could not be determined, and other dangerous state might occur.

This invention is intended to solve these problems, and it is hence a primary object of this invention to present an electric rear wheel steering apparatus capable of preventing occurrence of an incontrollable state even in the event of abnormality such as trouble of sensors, interruption of power supply to the motor or the like.

SUMMARY OF THE INVENTION

The electric rear wheel steering apparatus of this invention comprises an electromagnetic clutch disposed between a motor for steering the rear wheels and a worm reduction gear having a reversion efficiency of zero or lower, and a control unit designed to cut off an electric current flowing to the motor and disengage the electromagnetic clutch when an abnormal operation other than a predetermined operation is ascertained.

Accordingly, when a trouble of sensors or disconnection of power supply line or other abnormality is detected, the control unit stops the motor and disengages the electromagnetic clutch at the same time. As a result, the rear wheel steering is fixed at that position, so that the rear wheels are prevented from becoming incontrollable.

MOST PREFERRED EMBODIMENTS FOR ENFORCING INVENTION

Figure 1:
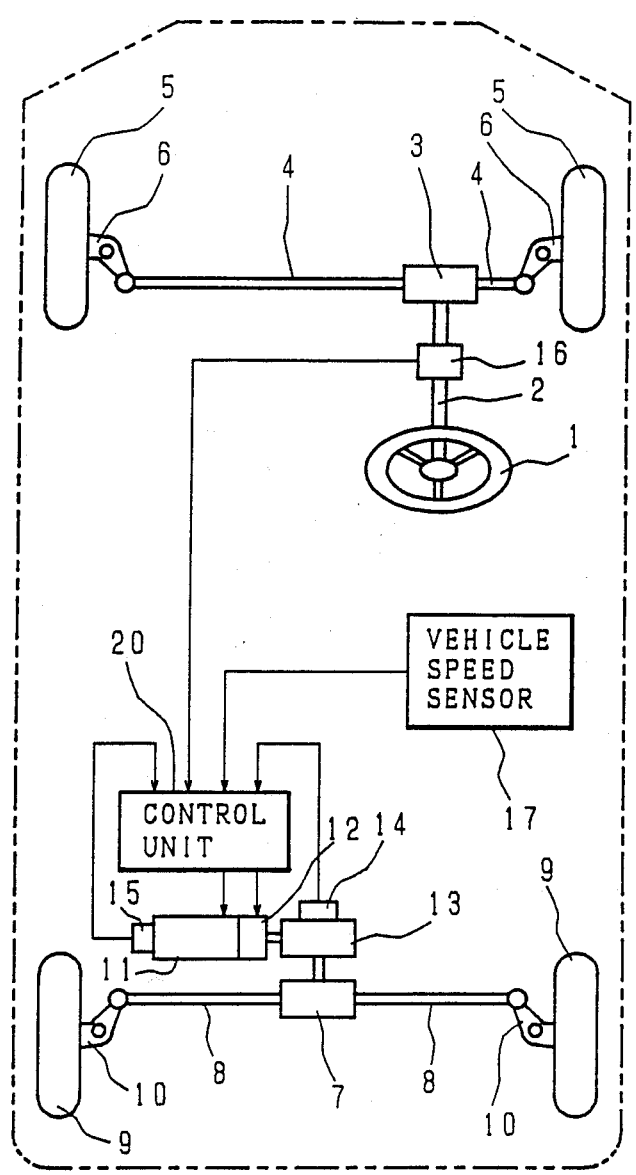
FIG. 1 is a structural drawing of an electric rear wheel steering apparatus according to one of the embodiments of this invention.

Referring now to the drawings, this invention is described below in further details.

FIG. 1 is a drawing showing the structure of an electric rear wheel steering apparatus according to one of the embodiments of this invention. In the drawing, reference numeral 1 denotes a steering wheel, 2 is a steering shaft for transmitting a steering torque to the wheel 1, 3 is a gear box for steering the front wheels incorporating therein a motion direction changing mechanism such as rack and pinion, 4 is a tie rod for steering the front wheels connected to the gear box 3 for steering the front wheels, 5 represents front wheels, and 6 is a knuckle arm which is coupled to the tie rod 4 to turn the front wheels 5.

Numeral 7 is a gear box for steering the rear wheels incorporating therein a motion direction changing mechanism such as a rack and pinion, 8 is a tie rod for steering the rear wheels, 9 represents rear wheels, and 10 is a knuckle arm which is coupled to the tie rod 8 to turn the rear wheels 9.

Numeral 11 is a DC motor which is a driving source for steering the rear wheels 9, 12 is an electromagnetic clutch for mechanically engaging or disengaging the output of the motor 11, 13 is a reduction gear having a motion direction changing mechanism by a worm and worm wheel for feeding the output of the motor 11 by way of the electromagnetic clutch 12, 14 is a rear wheel steering angle sensor for detecting the rotational angle after deceleration of the reduction gear 13, 15 is a motor rotation speed sensor which is coupled to the output shaft on the opposite side of the electromagnetic clutch 12 of the motor 11 to detect the rotation direction and speed of the motor 11, 16 is a steering state sensor for detecting at least one from among the steering direction, the steering angle, steering torque and the steering speed of the steering wheel 1, being disposed on the way of the steering shaft 2, 17 is a vehicle speed sensor for detecting the vehicle speed, and 20 is a control unit for sending out a drive signal between the motor 11 and the electromagnetic clutch 12 in response to the input signal of the above sensors.

Figure 2:
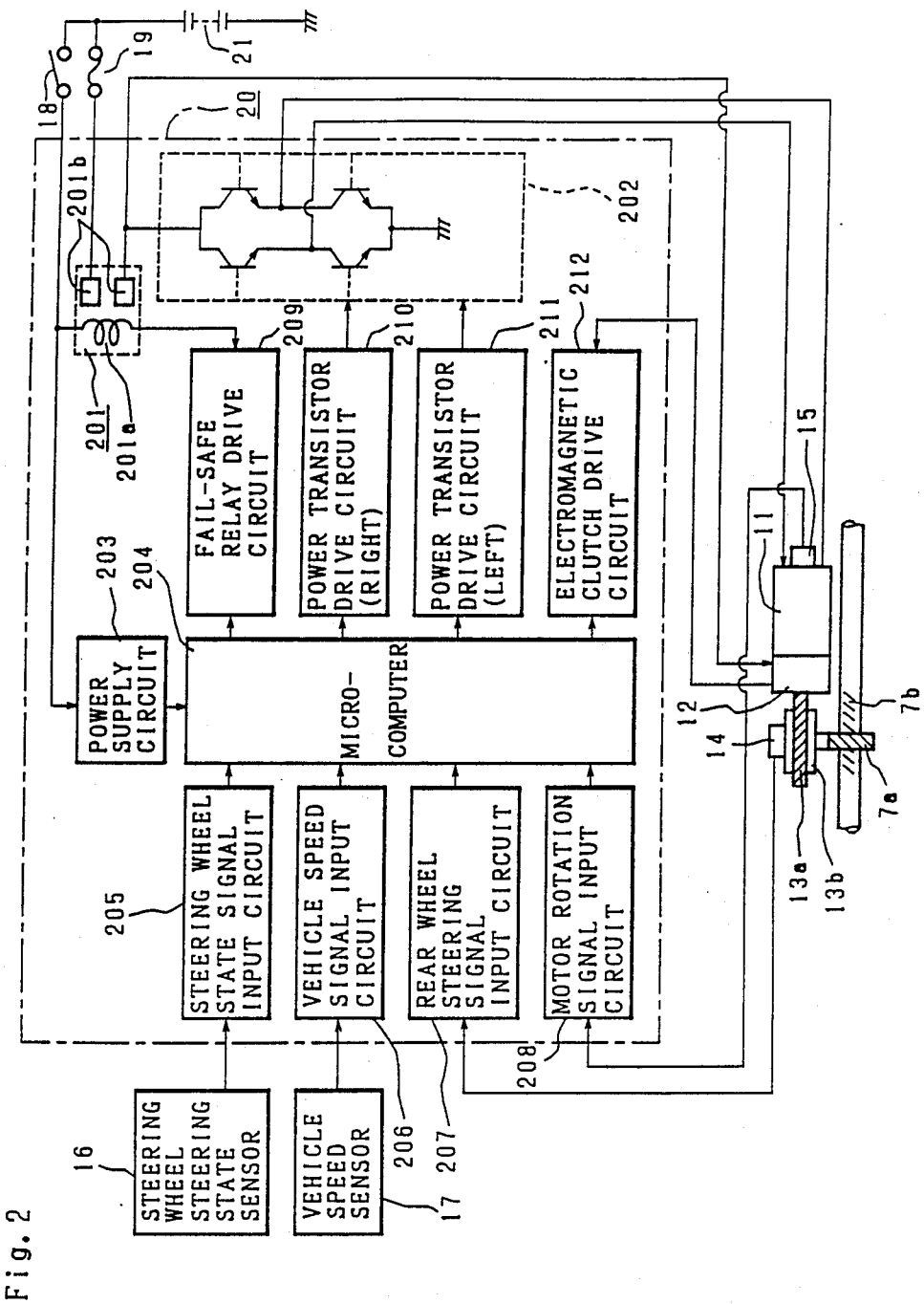
FIG. 2 is a block diagram showing essential parts of the same electric rear wheel steering apparatus.

FIG. 2 shows an internal structure of the control unit 20, electric wiring, and internal structures of the reduction gear mechanism and the gear box 7. In FIG. 2, numerals 18, 19 are a key switch and a fuse, which are connected between a car-mount battery 21 and the control unit 20. Numerals 13a, 13b are a worm composing the inside of the reduction gear 13 and a worm wheel meshing with the worm 13a and having a motion direction changing function with a reversion efficiency of zero or lower. Numeral 7a is a pinion fixed to the worm wheel 13b, and 7b is a rack for converting the rotation force of the pinion shaft 7a into a linear thrusting power, and the inside of the gear box 7 is composed of the pinion 7a and the rack 7b.

Numeral 201 is a fail-safe relay built in the control unit 20, and it has a driving coil 201a and normally open contacts 201b. Numeral 202 is a power transistor unit for changing over the direction of the voltage applied to the motor 11, 203 is a power supply circuit for a microcomputer 204, 205 is a steering wheel state signal input circuit corresponding to an input I/F circuit for converting the state signal from the steering wheel steering state sensor 16 (steering direction, steering angle, steering torque, steering speed, etc.) into an input signal for the microcomputer 204, 206 is a vehicle speed signal input circuit for composing the input I/F circuit of the vehicle speed signal from the vehicle speed sensor 17, 207 is a rear wheel steering signal input circuit for composing the input I/F circuit of rear wheel steering angle signal from the rear wheel steering angle sensor 14, 208 is a motor rotation signal input circuit for composing the input I/F circuit of a motor rotation speed signal from the motor rotation speed sensor 15, 209 is a fail-safe relay drive circuit for connecting or cutting off an electric current flowing to the driving coil 201a of said fail-safe relay 201 according to a decision by the microcomputer 204, 210 is a power transistor drive circuit (right) for driving the power transistor unit 202 so as to rotate the motor 11 clockwise responding to the instruction from the microcomputer 204, 211 is a power transistor drive circuit (left) for driving the power transistor unit 202 so as to rotate the motor 11 counterclockwise, and 212 is an electromagnetic clutch drive circuit for turning on and off the action of the electromagnetic clutch 12 responding to the instruction of the microcomputer 204.

The operation of thus composed electric rear wheel steering apparatus is described below. First, when the steering wheel 1 is turned right (or left), the steering torque is transmitted to the gear box 3 through the steering shaft 2, and the rotary motion is converted into a linear motion, and the tie rod 4 is driven right (or left), and the front wheels 5 are steered right (or left) through the knuckle arm 6. At this time, various pieces of information during steering the steering wheel 1 are detected by the steering state sensor 16 disposed on the way of the steering shaft 2, and the steering state signal is transmitted to the control unit 20. The control unit 20 receives, in addition to the signals from the steering sensor 16, the vehicle speed signal from the vehicle speed sensor 17, the rear wheel steering angle signal from the rear wheel steering angle sensor 14, and the motor rotation signal from the motor rotation speed sensor 15, and calculates the optimum rear wheel steering angle in each state, and drives the motor 11 and the electromagnetic clutch 12 to control the rear wheels 9 in the predetermined steering angle. Here, when the electromagnetic clutch 12 is driven, it is mechanically coupled, and when the motor 11 is driven next, the motor 11 rotates clockwise (or counterclockwise) responding to the instruction of the control unit 20. This rotation speed signal is, as mentioned above, fed back to the control unit 20 by the motor rotation speed sensor 15, and the torque of the motor 11 is transmitted to the reduction gear 13, and the speed is reduced while the motion direction is changed to be transmitted to the gear box 7, and the rear wheel steering signal is fed back from the rear wheel steering angle sensor 14 to the control unit 20. By the gear box 7, the rotary motion is converted into a linear motion, and the rear wheels 9 are steered right (or left) through the tie rod 8 and the knuckle arm 10, and when the rear wheel steering angle becomes the same as the rear wheel steering angle instructed by the control unit 20, the driving of the motor 11 is stopped. By repeating such action, the vehicle is controlled at a predetermined angle in a constant function with respect to the steering angles of the rear wheels 9 and the front wheels 5.

The action of the control unit 20 is described below. When the key switch 18 is closed, an electric power is supplied to the microcomputer 204 from the battery 21 by way of the key switch 18 and the power supply circuit 203, and the microcomputer 204 starts its action. At this time, the microcomputer 204 receives the signals of the steering wheel steering state sensor 16, the vehicle speed sensor 17, the rear wheel steering angle sensor 14 and the motor rotation speed sensor 15 by way of the steering wheel state signal input circuit 205, the vehicle speed signal input circuit 206, the rear wheel steering signal input circuit 207, and the motor rotation signal input circuit 208, respectively. On the basis of information of these sensors, the microcomputer 204 recognizes the state of the front and rear wheels 3, 9, the vehicle speed, and the motor rotation speed, that is, the rear wheel steering speed, and accordingly calculates the predetermined steering angle of the rear wheels 9 and determines the necessity of fail-safe action as the system. If there is an error between the predetermined value of the rear wheel steering determined on the basis of the result of calculation and the actual rear wheel steering angle detected by the rear wheel steering angle sensor 14, the instruction for rotating the motor 11 clockwise or counterclockwise to cancel the error is sent out from the microcomputer 204, and the power transistor drive circuit (right) 210 (or the power transistor drive circuit (left) 211) is turned on. The fail-safe drive circuit 209 drives the fail-safe relay 201 to close the contacts 201b as far as the system is decided to be normal, and the electric power is supplied from the battery 21 to the motor 11 by way of the fuse 19, the closed contacts 201b and the power transistor unit 202 to rotate clockwise (or counterclockwise), and the rear wheels 9 are steered right (or left) by way of the worm 13a, the worm wheel 13b, the pinion 7a and the rack 7b. In this way, when the error of the rear wheel steering is canceled, the microcomputer 204 turns off the power transistor drive circuit (right) 210 (or the power transistor drive circuit (left) 211), and the motor 11 is stopped. By repeating such action, the rear wheels are controlled at the predetermined steering angle in a constant function with respect to the steering angle of the front wheels.

Instead of such normal operation of the sensors, sensor wirings, and the control unit 20, if any trouble should occur, the fail-safe relay drive circuit 209 sends out a cut off instruction in response to the decision by the microcomputer 204. As a result, the driving coil 201a of the fail-safe relay 201 is cut off, and the closed contacts 201b are opened. In consequence, the power supply to the motor 11 and the electromagnetic clutch 12 is cut off, and when the motor 11 stops, the electromagnetic clutch 12 is operated at the same time to disengage the output shaft of the motor 11 from the worm 13a. Since the reversion efficiency is zero or lower, the worm 13a and the worm wheel 13b are fixed, and the pinion 7a and the rack 7b are also fixed, so that the rear wheels 9 are fixed so as no to be steered at the defective position even while the rear wheels are being steered. Therefore, after the action of the fail-safe function, it is all right to run only by front wheel steering as in a conventional automobile, and the danger may be kept to a minimum.

Similarly, when the disconnection of wires or other trouble should occur in part of the circuit for driving the power transistor unit 202, the motor 11 and the electromagnetic clutch 12 from the battery 21 by way of the fuse 19 and contact 201b, the rear wheels 9 are fixed at the fail-safe actuation point.

Thus, according to the electric rear wheel steering apparatus of this invention, since the electromagnetic clutch is provided between the motor for steering the rear wheels and the reduction gear, the motor is stopped and the electromagnetic clutch is disengaged in the event of abnormality, and the steering of the rear wheels is fixed at that position if any trouble should occur in the sensors or their wirings, so that incontrollable state due to abnormal action of the rear wheels may be prevented, and at the same time moving can be continued even after trouble by the corrective steering of the front wheels.

What is claimed is:

1. An electric rear wheel steering apparatus for steering rear wheels of a vehicle by a motor
    having a worm
    reduction gear
    (11) depending on the steering state of front wheels of said vehicle, comprising: a steering wheel steering state sensor (16) for detecting at least one of the steering states of the steering direction, steering angle, steering torque, and steering speed of the steering wheel , a vehicle speed sensor (17) for detecting the vehicle speed, a motor rotation speed sensor (15) for detecting the rotation direction and rotation speed of said motor, a rear wheel steering angle sensor (14) for detecting the steering angle of rear wheels, an electromagnetic clutch (12) disposed between said motor and said worm reduction gear (13) for transmitting the rotation force of the motor having a reversion efficiency of zero or lower so as to engage or disengage the rotation force of the motor, a gear box (7) for steering the rear wheels being driven by the output of said worm reduction gear, and a control unit (20) for receiving signals from said steering wheel steering state sensor, said vehicle speed sensor, said motor rotation speed sensor, and said rear wheel steering angle sensor to drive and control the motor in response to
    said sensor signals, and for cutting off the current supply to the motor and disengage the electromagnetic clutch when an abnormal operation other than predetermined operation is ascertained.

2. An electric rear wheel steering apparatus as set forth in claim 1, further comprising a fail-safe relay (201) having normally open contacts disposed
    in series in the power supply line to the motor and the electromagnetic clutch, and a fail-safe relay drive circuit (209) for driving the fail-safe relay, wherein if the control unit detecto any abnormality in said sensor signals, the control unit sends out a cut-off signal for the fail-safe relay to the fail-safe relay drive circuit.

* * * * *